United States Patent [19]

Hartery

[11] Patent Number: 5,558,346
[45] Date of Patent: Sep. 24, 1996

[54] PUSH PLUG SEAL WITH SEALING PATCH SECURED BY TABS

[75] Inventor: William Hartery, Watertown, Conn.

[73] Assignee: Illinois Tool Works, Inc., Glenview, Ill.

[21] Appl. No.: 378,518

[22] Filed: Jan. 26, 1995

[51] Int. Cl.⁶ .............................. F16J 15/00; B65D 39/00
[52] U.S. Cl. ........................ 277/189; 277/166; 277/181; 220/307; 220/315; 411/510
[58] Field of Search ................................ 277/9, 11, 181, 277/189, 166; 220/307, 308, 315, 323, 326, 352; 411/508, 509, 510, 913

[56] References Cited

U.S. PATENT DOCUMENTS

| | | | |
|---|---|---|---|
| 3,018,535 | 1/1962 | Griffin | 220/326 |
| 3,990,604 | 11/1976 | Barnett et al. | 220/307 |
| 4,091,962 | 5/1978 | van Buren | 220/326 |
| 4,391,384 | 7/1983 | Moore et al. | 220/307 |
| 4,588,104 | 5/1986 | Danico | 220/307 |
| 4,809,872 | 3/1989 | Pavur | 270/307 |

Primary Examiner—Daniel G. DePumpo
Attorney, Agent, or Firm—St. Onge Steward Johnston & Reens

[57] ABSTRACT

A push plug seal and method of manufacturing the same provides a series of sharp-pointed tabs that lance into and are bent over to engage a sealer patch.

8 Claims, 2 Drawing Sheets

1

PUSH PLUG SEAL WITH SEALING PATCH SECURED BY TABS

FIELD OF THE INVENTION

The present invention relates to an seal for a snap plug or push plug of the type used to seal apertures in automobile body parts after painting.

DESCRIPTION OF THE PRIOR ART

A variety of plug assemblies are known in the art as suitable to close or seal an aperture such as paint drain holes in an automobile body. The apertures permit paint to drain after the automobile body is dipped into paint or other coatings to minimize waste and uneven application of the paint or other coatings. Typical known push plugs include those described in U.S. Pat. No. 4,809,872 and others. The plugs typically include a series of gripping fingers that are formed with the plug to grip the lip of an aperture in a car body, and a heat activated sealer is used in conjunction therewith. Heretofore, such sealers are typically located between the plug body and the automotive body, and have been annular in shape. In some cases, a circular sealer is fastened to the plug on its outer face by heat wherein the sealer is bonded to the metal plug body in a central area of the plug.

SUMMARY OF THE INVENTION

It is an object of the invention to provide an improved push plug and method of manufacturing the push plug that is more economical to manufacture and more sturdy than prior art plug assemblies.

A push plug in accordance with one embodiment of the invention comprises a metal plug and a sealer patch secured thereto by self-lancing tabs. In particular, the plug comprises a metal one-piece plug body having at least two gripping legs and preferably three such legs extending generally perpendicularly away from the plug body. The legs have gripping tabs for gripping the aperture in an automobile body. The plug body has a plurality of substantially triangular sharp-pointed tabs located intermediate the legs around a perimeter of the plug body and extending perpendicularly away from the plug body oppositely from the legs. The elastomeric sealing patch is located against the plug body on a side of the plug body whereby the sharp-pointed tabs penetrate the patch and retain the patch to the plug body. The sharp-pointed tabs are folded over to retain the patch to the plug body.

A method of manufacturing a push plug in accordance with one embodiment of the invention comprises the steps of stamping a plug blank. The stamped plug blank has at least two, and preferably three, gripping legs. The legs each have gripping tabs for gripping an aperture to be covered by the plug. The blank has a plurality of sharp-pointed tabs located intermediate the legs around a perimeter of the plug blank. The legs are progressively bent in a progressive die to extend perpendicularly from the plug blank, with the gripping tabs extending outwardly from the legs. The sharp-pointed tabs are bent to extend perpendicularly away from the plug blank opposite from the legs. The plug blank is then placed against a strip of an elastomeric sealing patch material, and the patch material is pierced by the sharp-pointed tabs. The tabs are folded over to secure the patch to the plug blank. The patch material is cut, preferably simultaneously with, the tab folding step, to a desired shape and is separated from the strip of patch material.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 1:
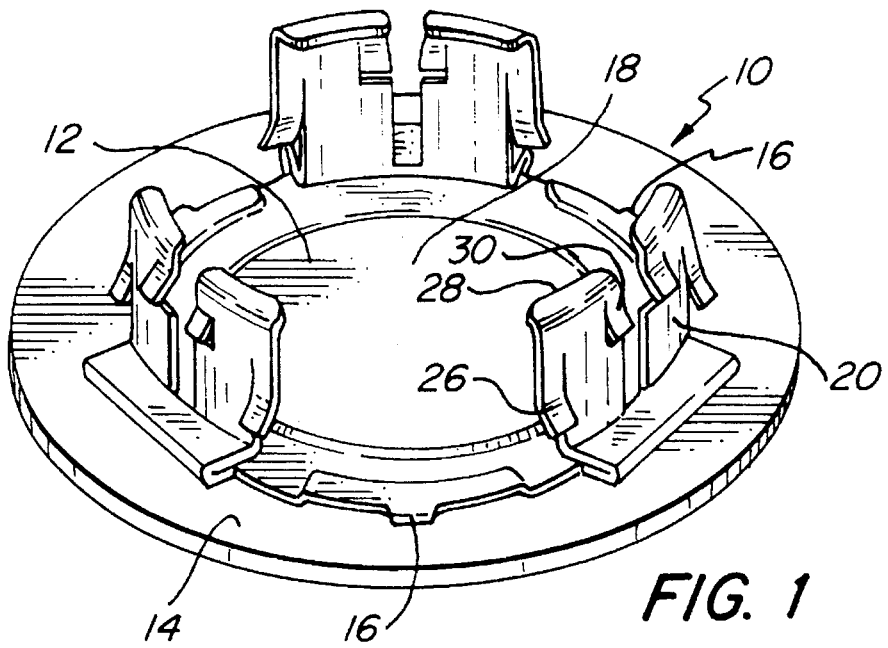
FIG. 1 is a perspective view of an embodiment of an improved push plug in accordance with the invention.
Figure 2:
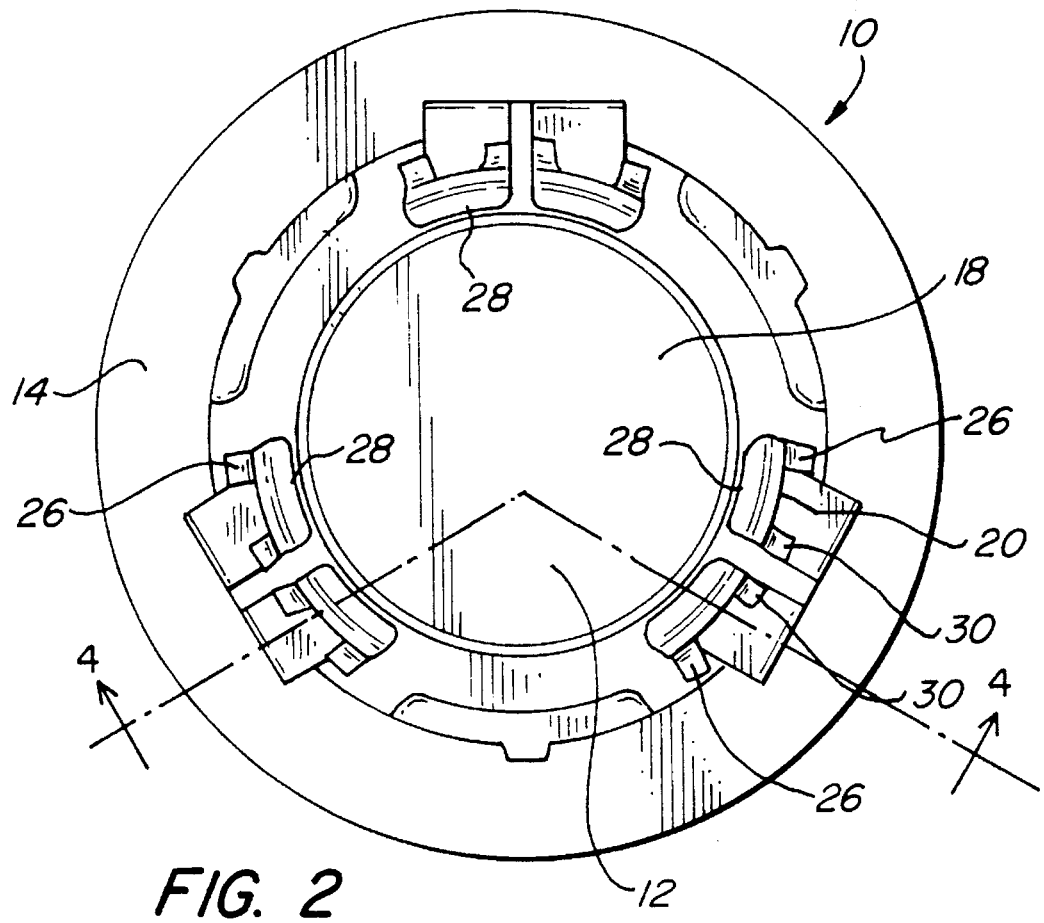
FIG. 2 is a bottom plan view of the embodiment of the push plug of FIG. 1.
Figure 3:
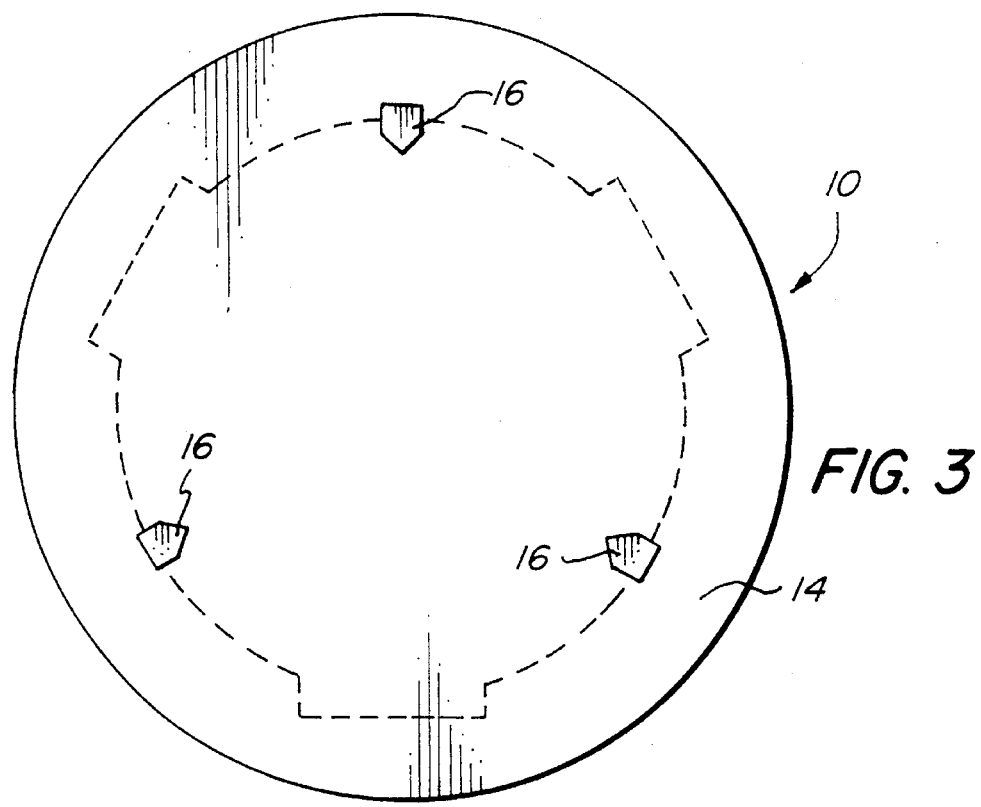
FIG. 3 is a top plan view of the embodiment of the push plug of FIG. 1.
Figure 4:
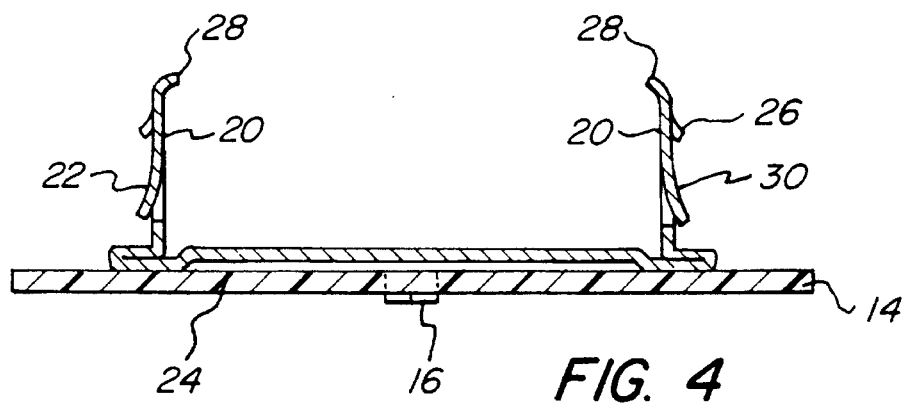
FIG. 4 is a cross-sectional view of the embodiment of the push plug of FIG. 1 along the line 4—4.
Figure 5:
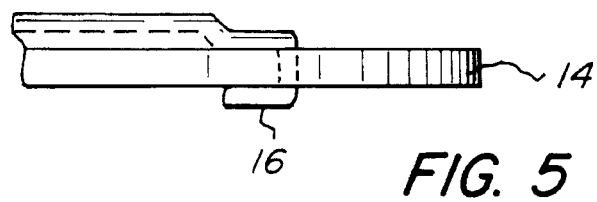
FIG. 5 is a detail view of the sharp pointed tabs of the plug of FIG. 1 engaged with a sealer patch.

Referring now to FIGS. 1–5, where like numerals indicate like elements in the drawings, an improved push plug 10 in accordance with one embodiment of the invention is shown. Push plug 10 comprises a metal plug 12 and a sealer patch 14 secured to plug 12 by self-lancing tabs 16. In particular, the plug comprises a metal one-piece plug body 18 having at least two gripping legs 20 extending generally perpendicularly away from the plug body 18. Preferably there are three such gripping legs 20 for use with most size apertures, although in some instances, for example, where the plug 10 is to be used with a relatively smaller size aperture, only two such gripping legs 20 may be desirable.

Legs 20 have gripping tabs 22 for gripping the aperture in an automobile body. Preferably there are two sets of gripping tabs 22 on each leg for gripping the aperture. In such case, one set of tabs 26 is located intermediate the body 18 and free ends 28 of the legs 20, thereby providing a second mounting position when the plug legs are inserted into the aperture. A second set of tabs 30 is located adjacent the free ends 28 of legs 20 thereby providing a first mounting position with the plug body 18 flush against the aperture of the automobile body.

Plug body 18 has a plurality, preferably three, substantially triangular sharp-pointed tabs 16 located intermediate the legs 20 around a perimeter of the plug body 18. Preferably the three tabs 16 are located about 120 degrees apart. Sharp-pointed tabs 16 extend perpendicularly away from the plug body 18 in a direction oppositely from the direction that legs 20 extend. The elastomeric sealing patch 14 is located against the plug body on a side 24 of the plug body 18 whereby the sharp-pointed tabs 16 penetrate the patch 14 and retain the patch 14 to the plug body 18. The sharp-pointed tabs 16 are folded over to retain the patch 14 to the plug body 18.

The elastomeric patch 14 is affected by heat such that subsequent heating of the patch 14 will cause it to weld to the automobile body to provide a secure, watertight seal.

A method of manufacturing a push plug 10 in accordance with one embodiment of the invention comprises the steps of stamping a plug blank. The stamped plug blank has a body 18 and at least two, and preferably three gripping legs 20. The legs 20 each have gripping tabs 22 for gripping an aperture to be covered by the plug 10. The blank has a plurality of sharp-pointed tabs 16 located intermediate the legs 20 around a perimeter of the plug blank. The legs 20 are bent in a progressive die to extend perpendicularly from the plug blank with the gripping tabs extending outwardly from the legs 20. The sharp-pointed tabs 16 are bent to extend perpendicularly away from the plug blank opposite from the legs 20. The plug blank is then placed against a strip of an elastomeric sealing patch material, and the patch material is pierced by the sharp-pointed tabs 16. The tabs 16 are folded over to secure the patch to the plug blank. The patch material is cut, preferably simultaneously with the tab folding step, to a desired shape and is separated from the strip of patch material.

The present invention improves over prior art devices by eliminating the need for the welding step needed to secure the sealer to the plug in prior art devices. This reduces electrical consumption costs, and provides a secure, mechanical fastening.

In addition, the invention provides the seal on the outside of the plug to provide an unusually secure and watertight seal.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A push plug, comprising:
a metal one-piece plug for sealing an aperture extending through a vehicle body panel, said plug having a plug body having at least two gripping legs extending generally perpendicularly away from said plug body, said legs each having two sets of gripping tabs for gripping said aperture, one set of tabs being located intermediate said plug body and free ends of said legs thereby providing second mounted position and a second set of tabs located adjacent said free ends of said legs thereby providing a first mounted position, said plug body having a plurality of substantially triangular sharp-pointed tabs located intermediate said legs around a perimeter of said plug body and extending perpendicularly away from said plug body oppositely from said legs;
an elastomeric sealing patch located against said plug body on a side of said plug body said sharp-pointed tabs penetrating the patch and retaining the patch to said plug body.

2. A push plug in accordance with claim 1 wherein ends of said sharp-pointed tabs are folded over to retain said patch to said plug body.

3. A push plug in accordance with claim 1 wherein there are three of said gripping legs.

4. A push plug, comprising:
a metal one-piece plug for sealing an aperture extending through a vehicle body panel comprising: a plug body having at least two gripping legs extending generally perpendicularly away from said plug body, said legs each having gripping tabs for gripping said aperture, said plug body having a plurality of sharp-pointed tabs located intermediate said legs around a perimeter of said plug body and extending perpendicularly away from said plug body oppositely from said legs;
an elastomeric sealing patch located against said plug body on a side of said plug body whereby said sharp-pointed tabs penetrate the patch and retain the patch to said plug body.

5. A push plug in accordance with claim 4 wherein ends of said sharp-pointed tabs are folded over to retain said patch to said plug body.

6. A push plug in accordance with claim 4 wherein there are three of said gripping legs.

7. A push plug, comprising:
a metal one-piece plug for sealing an aperture extending through a vehicle body panel comprising: a plug body having at least two gripping legs extending generally perpendicularly away from said plug body, said legs each having gripping tabs for gripping said aperture, said plug body having a plurality of sharp-pointed tabs located intermediate said legs around a perimeter of said plug body and extending perpendicularly away from said plug body oppositely from said legs;
an elastomeric sealing patch located against said plug body on a side of said plug body said sharp-pointed tabs penetrating the patch and being bent over to retain said patch to said plug body.

8. A push plug in accordance with claim 8 wherein there are three of said gripping legs.

* * * * *